United States Patent
Morina et al.

(10) Patent No.: US 8,193,778 B2
(45) Date of Patent: Jun. 5, 2012

(54) METHOD OF CHARGING A BATTERY ARRAY

(75) Inventors: Kenichi Morina, Hyogo (JP); Katsuhiro Suzuki, Hyogo (JP); Yoshiro Uenaka, Hyogo (JP); Tomomi Kaino, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 455 days.

(21) Appl. No.: 12/216,907

(22) Filed: Jul. 11, 2008

(65) Prior Publication Data

US 2009/0015209 A1 Jan. 15, 2009

(30) Foreign Application Priority Data

Jul. 13, 2007 (JP) ................................. 2007-184481
Jan. 11, 2008 (JP) ..................................... 2008-5036

(51) Int. Cl.
*H02J 7/04* (2006.01)
*H02J 7/16* (2006.01)
(52) U.S. Cl. .................. 320/153; 320/116; 320/150
(58) Field of Classification Search .................. 320/116, 320/118, 119, 122, 153
See application file for complete search history.

(56) References Cited

U.S. PATENT DOCUMENTS

| | | | | |
|---|---|---|---|---|
| 4,238,721 A * | 12/1980 | DeLuca et al. | | 320/122 |
| 6,975,094 B1 * | 12/2005 | Lascaud et al. | | 320/122 |
| 7,572,235 B2 * | 8/2009 | Holte | | 600/561 |
| 7,573,235 B2 * | 8/2009 | Hand | | 320/122 |
| 2008/0197805 A1 * | 8/2008 | Pellenc | | 320/116 |
| 2008/0211457 A1 * | 9/2008 | Rudorff et al. | | 320/118 |
| 2009/0102428 A1 * | 4/2009 | Aradachi et al. | | 320/153 |

FOREIGN PATENT DOCUMENTS

JP 2001-126772 5/2001

* cited by examiner

*Primary Examiner* — Ramy Ramadan
(74) *Attorney, Agent, or Firm* — Wenderoth Lind & Ponack, L.L.P.

(57) ABSTRACT

The method of charging a battery array performs constant current and constant voltage charging of a battery array while detecting the voltage of each battery. The battery array is a plurality of series connected batteries. The charge method detects the voltage of each battery cell at a prescribed sampling rate. When the voltage of any battery cell exceeds a preset maximum specified voltage, charging power is reduced for constant current, constant voltage charging of the battery array.

37 Claims, 13 Drawing Sheets

METHOD OF CHARGING A BATTERY ARRAY

BACKGROUND OF THE INVENTION

1. Field of the Invention

The present invention relates to a method of charging a battery array that is a plurality of batteries connected in series, and in particular relates to a method that is optimal for charging a battery array that is a plurality of lithium ion rechargeable batteries connected in series.

2. Description of the Related Art

When a battery array, which is a plurality of batteries connected in series, is charged, each battery is charged by the same charging current. Therefore, if the electrical characteristics of all the batteries are identical, each battery will be charged to the same voltage. However, in an actual battery array, the voltage of each battery does not become the same. This is because the electrical characteristics of all battery cells cannot be made completely the same. The voltage difference of each battery relative to others becomes larger with use. This is because the relative imbalance in degradation of each battery increases with use. This drawback can be eliminated by a method that charges each series connected battery independently. However, a charging circuit for this method becomes complex, and since it is necessary to expose each battery connecting node externally as a terminal, there is no way the method can be adopted in actuality. Further, a practical battery array of this type has not been developed. As a result, a battery array is charged by connection of its positive and negative output terminals to a battery charger. Consequently, voltage differences develop due to the relative imbalance of the batteries.

If the voltage of a particular battery exceeds a maximum specified voltage during charging, degradation of that battery becomes significant, and safely charging the battery array becomes impossible. For this reason a method that charges a battery array while detecting the voltage of each battery and suspends charging when the voltage of any battery exceeds a maximum specified voltage is cited in Japanese Patent Application Disclosure 2001-126772

SUMMARY OF THE INVENTION

The charging method described above can charge a battery array while controlling the voltage of each battery at or below the maximum specified voltage. However, since that charging method suspends charging when the voltage of any one battery rises to the maximum specified voltage, it has the drawback that it cannot charge the battery array to sufficient capacity when an imbalance develops between batteries. This is because charging is suspended even though batteries, which have a voltage that has not reached the maximum specified voltage, are in a state that can accept further charging.

The present invention was developed to resolve the drawbacks described above. Thus, it is a primary object of the present invention to provide a method of charging that can increase the charge capacity of a battery array while controlling the voltage of each battery at or below a maximum specified voltage.

To achieve the object describe above, the method of charging a battery array of the present invention is comprised as follows. The method of charging a battery array charges the plurality of series connected batteries by constant voltage and constant current charging while monitoring the voltage of each battery. This charging method detects the voltage of each battery cell at a prescribed sampling rate. When the voltage of any battery cell exceeds a previously set maximum specified voltage, constant voltage and constant current charging is performed by reducing the amount of power supplied to charge the battery array.

The charging method described above has the characteristic that battery array charge capacity can be increased while controlling the voltage of each battery at or below the maximum specified voltage. This is because the charging method above detects the voltage of each battery cell at a prescribed sampling rate, and when the voltage of any battery cell exceeds the maximum specified voltage, it reduces the specified voltage for constant voltage charging or it reduces the specified current for constant current charging of the battery array. Furthermore, the charging method continues constant voltage or constant current charging of the battery array with reduced power.

FIG. 4 is a graph showing the voltage and charging current of battery cells of a battery array that is charged by an embodiment of the method of charging a battery array of the present invention. As shown in this figure, when the voltage of the high voltage battery cell exceeds the maximum specified voltage, charging is controlled to reduce charging power at time (t1). Since charging power is controlled lower, charging current is lower and battery array charging voltage is decreased. Voltage of the high voltage battery cell decreases as a result of lower charging current and drops lower than the maximum specified voltage. In this state, the battery array is further charged and the high voltage battery cell gradually increases in voltage. When the high voltage battery cell again exceeds the maximum specified voltage, charging power is further reduced at time (t2). This charging scenario is repeated at times (t3, t4) and charging is completed when battery array charging current drops to a minimum current. In this manner a battery array pan be charged to sufficient capacity while controlling the voltage of the high voltage battery cell not to exceed the maximum specified voltage. More precisely, the high voltage battery cell exceeds the maximum specified voltage for an extremely short time, but is subsequently controlled not to exceed the maximum specified voltage. In particular, the charging method of the present invention does not control the high voltage battery cell below the maximum specified voltage by initially limiting charging current to a smaller value at the start of charging. Charging power is controlled to a reduced level when the voltage of the high voltage battery cell exceeds the maximum specified voltage. Therefore, the charging method of the present invention can sufficiently charge a battery array by charging with high current at the start while keeping the voltage of the high voltage battery cell below the maximum specified voltage. Consequently, the charging method of the present invention realizes the characteristic that the battery array can be fully charged in a short period, can maintain the voltage of the high voltage battery cell below the maximum specified voltage, and can increase overall charge capacity of the battery array.

The method of charging a battery array of the present invention detects the voltage of each battery cell at a prescribed sampling rate. When the voltage of any battery cell exceeds the pre-set maximum specified voltage, the voltage for charging the battery array or the charging current can be controlled to a reduced level for constant voltage charging and constant current charging.

Power supplies used for charging battery arrays are almost without exception switching power supplies. In a switching power supply, input 100V alternating current (AC) is converted to direct current (DC). Switched DC power is input to the input-side of a transformer via a switching device. AC from the output-side of the transformer is rectified to convert it to DC for output as charging power to the battery array. In the switching power supply, output voltage and current are stabilized by the on and off switching duty cycle of the switching device. To stabilize output voltage, a voltage feedback circuit is provided to control the duty cycle of the switching device. Further, to stabilize output current, a current feedback circuit is provided to control the duty cycle of the switching device. In this charging method, battery array charging power can be easily controlled by controlling the voltage feedback circuit. In addition, battery array charging power can be easily controlled by controlling the current feedback circuit.

The charging method of the present invention detects the voltage of each battery cell at a prescribed sampling rate. When the voltage of any battery cell exceeds the pre-set maximum specified voltage, the voltage for charging the battery array is reduced for constant voltage and constant current charging. In this type of charging method, when the voltage of the high voltage battery cell exceeds the maximum specified voltage, the voltage for charging the battery array can be reduced by a prescribed ratio. Further, when the voltage of the high voltage battery cell exceeds the maximum specified voltage, the set current for charging the battery array can be reduced by a prescribed ratio. In this charging method, each time the voltage of the high voltage battery cell exceeds the maximum specified voltage, voltage for charging the battery array is reduced by 5%, or the set current is reduced by 20%. This charging method can charge a battery array to sufficient capacity with a simple circuit configuration while preventing the voltage of the high voltage battery cell from becoming abnormally high.

Again, the charging method of the present invention detects the voltage of each battery cell at a prescribed sampling rate. When the voltage of any battery cell exceeds the pre-set maximum specified voltage, the voltage for charging the battery array is reduced for constant voltage and constant current charging. In this type of charging method, when the voltage of the high voltage battery cell exceeds the maximum specified voltage, the ratio for reducing the charging voltage or the set current can be determined from the voltage difference between the voltage of the high voltage battery cell and the maximum specified voltage. When the voltage difference is large, the ratio for reducing the charging voltage or the set current can be made large. Once the voltage of the high voltage battery cell has exceeded the maximum specified voltage, this method can charge the battery array with optimum voltage and current. Consequently, the battery array can be charged in a short time to sufficient capacity while preventing the voltage of the high voltage battery cell from becoming abnormally high.

Again, the charging method of the present invention detects the voltage of each battery cell at a prescribed sampling rate. When the voltage of any battery cell exceeds the pre-set maximum specified voltage, the voltage for charging the battery array is reduced for constant voltage and constant current charging. In this type of charging method, when the voltage of the high voltage battery cell exceeds the maximum specified voltage, the ratio for reducing the charging voltage or the set current can be determined from the internal resistance of the battery cell that exceeded the maximum specified voltage. When the internal resistance of that battery cell is high, the ratio for reducing the charging voltage or the set current can be made large. In this charging method as well, the battery array can be charged with optimum voltage and current after the voltage of the high voltage battery cell has exceeded the maximum specified voltage. Consequently, the battery array can be charged in a short time to sufficient capacity while preventing the voltage of the high voltage battery cell from becoming abnormally high.

Again, the charging method of the present invention detects the voltage of each battery cell at a prescribed sampling rate. When the voltage of any battery cell exceeds the pre-set maximum specified voltage, the voltage for charging the battery array is reduced for constant voltage and constant current charging. In this type of charging method, when the voltage of any battery cell exceeds the maximum specified voltage, the voltage for charging the battery array can be reduced to a battery voltage that is the sum of the voltages of each battery cell.

This charging method can continue charging the battery array while simplifying charging voltage control and reliably preventing charging voltage from becoming lower than the battery voltage.

The charging method of the present invention can change the maximum specified voltage, which is compared with the voltage of a high voltage battery cell, depending on battery temperature. By this method, the battery array can be charged while protecting the batteries and avoiding battery performance degradation in low temperature or high temperature operating conditions.

The charging method of the present invention detects the voltage of each battery cell at a prescribed sampling rate. When the voltage of any battery cell exceeds the pre-set maximum specified voltage, the set current for charging the battery array is reduced for constant voltage and constant current charging. The set current can be changed depending on battery temperature. Furthermore, in the charging method of the present invention, reduction in the set current can proceed in multiple stages of current settings.

The charging method above can charge a battery array while protecting the batteries and avoiding battery performance degradation in low temperature or high temperature operating conditions. Further, since reduction in the set current is by multiple stages of current settings, the charging method is simple and convenient, and the power supply circuit can be simple and inexpensive.

The above and further objects of the present invention as well as the features thereof will become more apparent from the following detailed description to be made in conjunction with the accompanying drawings.

DESCRIPTION OF THE INVENTION

The method of charging a battery array can reduce the voltage for charging the battery array by a prescribed ratio when the voltage of any battery cell exceeds a maximum specified voltage.

When the voltage of any battery cell exceeds the maximum specified voltage, the method of charging can reduce the voltage for charging the battery array, and the ratio for reducing the charging voltage can be determined from the voltage difference between the maximum specified voltage and the voltage of the battery cell. When the voltage difference is large, the ratio for reducing the charging voltage can be made large.

When the voltage of any battery cell exceeds the maximum specified voltage, the method of charging can reduce the voltage for charging the battery array, and the ratio for reducing the charging voltage can be determined from the internal resistance of the battery cell that exceeded the maximum specified voltage. When the internal resistance of that battery cell is high, the ratio for reducing the charging voltage can be made large.

The method of charging a battery array detects the voltage of each battery cell at a prescribed sampling rate. When the voltage of any battery cell exceeds the pre-set maximum specified voltage, the set current for charging the battery array can be reduced for constant voltage and constant current charging.

The method of charging a battery array can also reduce the set current for charging the battery array by a prescribed ratio when the voltage of any battery cell exceeds a maximum specified voltage.

When the voltage of any battery cell exceeds the maximum specified voltage, the method of charging can reduce the set current for charging the battery array, and the ratio for reducing the set current can be determined from the voltage difference between the maximum specified voltage and the voltage of the battery cell. When the voltage difference is large, the ratio for reducing the set current can be made large.

When the voltage of any battery cell exceeds the maximum specified voltage, the method of charging can reduce the set current for charging the battery array, and the ratio for reducing the set current can be determined from the internal resistance of the battery cell that exceeded the maximum specified voltage. When the internal resistance of that battery cell is high, the ratio for reducing the set current can be made large.

In the method of charging a battery array, the maximum specified voltage can be changed depending on battery temperature.

Figure 1:
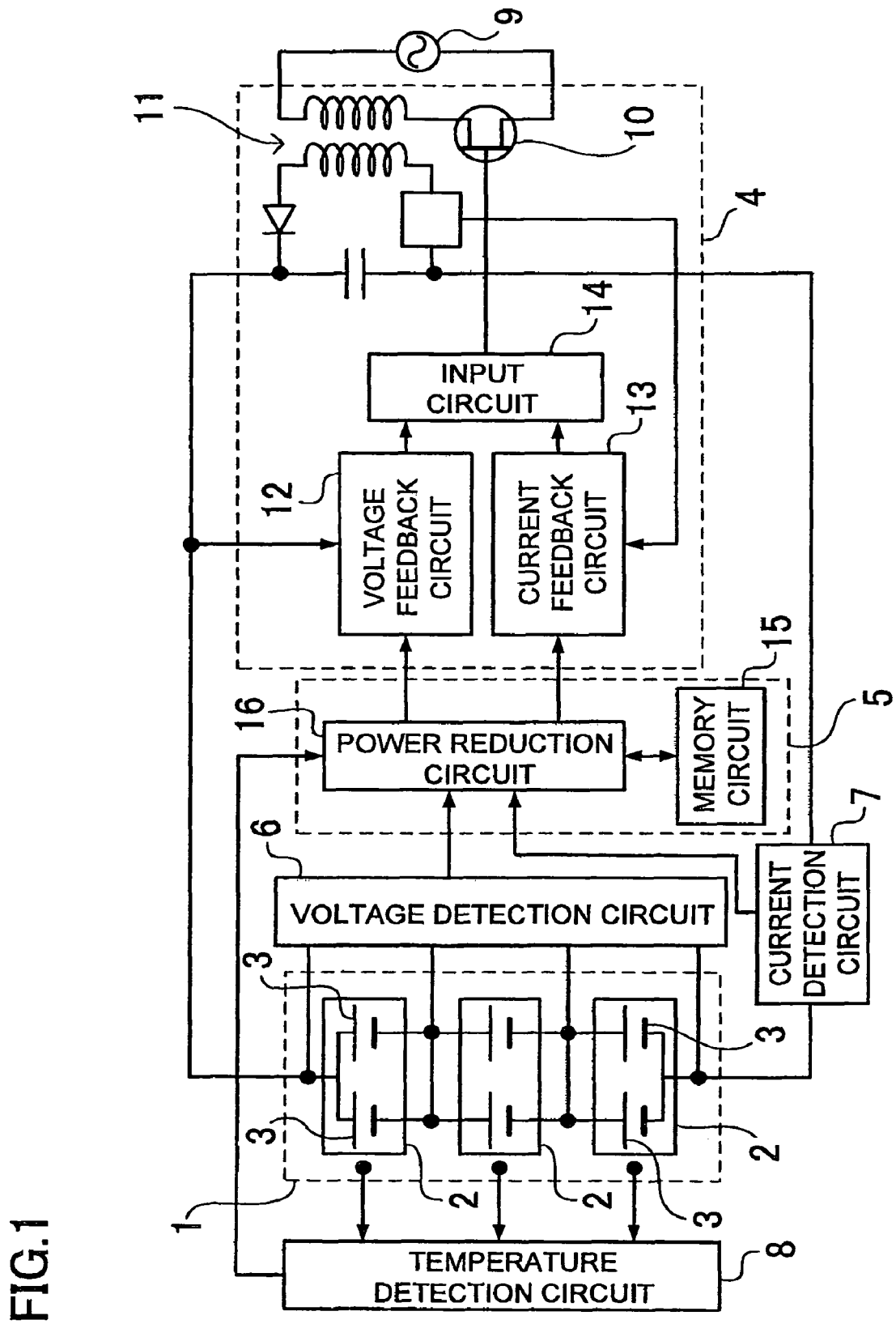
FIG. 1 is a block diagram showing an example of a charging circuit used in one embodiment of the method of charging a battery array of the present invention.

The following describes embodiments of the present invention based on the figures. FIG. 1 is a block diagram of a charging circuit for charging a battery array 1 made up of a plurality of lithium ion rechargeable batteries 3. The charging circuit of FIG. 1 is provided with a power supply circuit 4 for constant current and constant voltage charging of the battery array 1, a control circuit 5 to control the charging voltage and set current for charging the battery array 1 with the power supply circuit 4, a voltage detection circuit 6 to detect the voltage of each battery 3 and output it to the control circuit 5, a current detection circuit 7 to detect the battery 3 charging current, and a temperature detection circuit 8 to detect and output the temperature of the batteries 3.

The battery array 1 of the figure has three battery cells connected in series. Each battery cell 2 has two lithium ion rechargeable batteries 3 connected in parallel. As shown in this figure, a battery cell 2 can have a plurality of unit cells 3 connected in parallel. However, a battery cell can also be configured as a single unit cell. Although the battery array 1 of the figure has three battery cells 2 connected in series, a battery array charged by the method of the present invention can have two battery cells connected in series or it can have four or more battery cells connected in series.

The power supply circuit 4 is a switching power supply. The switching power supply switches DC power obtained by rectifying commercial power 9, which is 100V AC (120V AC in the US). The DC power is switched by a switching device 10 for input to the primary-side of the transformer 11. AC output from the secondary-side of the transformer 11 is rectified and output as charging power for the battery array 1. In this switching power supply, output is controlled by the on and off duty cycle of the switching device 10. Output is increased by lengthening the time the switching device 10 is on, and output is decreased by shortening the time the switching device 10 is on. Since the power supply circuit 4 charges the battery array 1 with constant voltage and constant current, it has a voltage feedback circuit 12 to control output voltage to a constant maximum value and a current feedback circuit 13 to limit output current to a constant maximum value. Both feedback circuits are connected to the input circuit 14 of the switching device 10. The voltage feedback circuit 12 controls the duty cycle of the switching device 10 via the input circuit 14, and controls the maximum output voltage to be the maximum voltage of the battery array 1. For example, maximum output voltage is set to 12.6V for a power supply circuit 4 that charges a battery array 1 with three battery cells 2 connected in series. Further, the current feedback circuit 13 controls the duty cycle of the switching device 10 via the input circuit 14, and controls the maximum output current to be the maximum current for charging the battery array 1.

The voltage detection circuit 6 detects the voltage of each battery cell 2 connected in series, converts the detected voltage to a digital signal, and inputs that signal to the control circuit 5. The current detection circuit 7 detects battery array 1 charging current, converts the detected current to a digital signal, and inputs that signal to the control circuit 5. In addition, the temperature detection circuit 8 detects battery 3 surface temperature, converts the detected temperature to a digital signal, and inputs that signal to the control circuit 5.

The control circuit 5 is provided with a memory circuit 15 that stores the maximum specified voltage of the battery, and a power reduction circuit 16 that compares the maximum specified voltage stored in the memory circuit 15 with the battery voltage and controls battery array 1 charging voltage and charging current.

Figure 2:
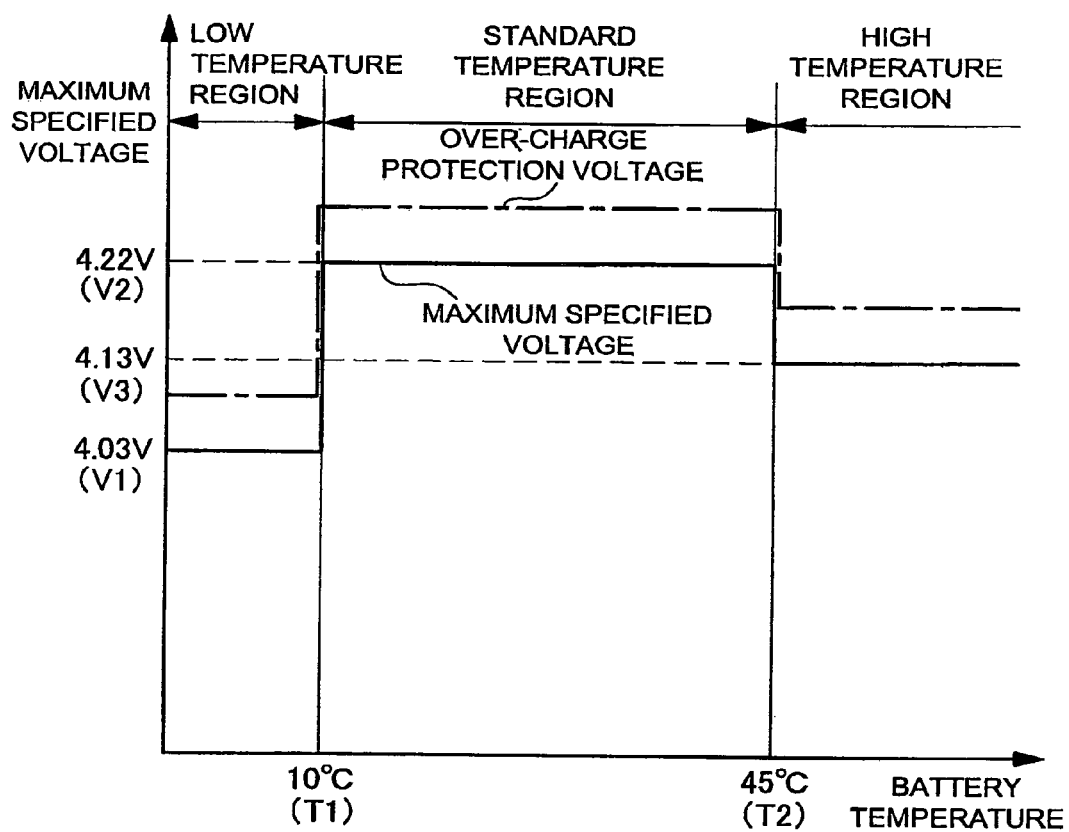
FIG. 2 is a graph showing maximum specified voltage versus battery temperature.

FIG. 2 shows the maximum specified voltage stored in the memory circuit 15. Here, the maximum specified voltage is a voltage set somewhat lower than the over-charge protection voltage, which is the absolute maximum voltage that a charging battery should never exceed. The memory circuit 15, which stores the data of FIG. 2, stores a maximum specified voltage for each temperature region. Temperature of the charging battery is separated into a low temperature region, a standard temperature region, and a high temperature region. The low temperature boundary temperature (T1) between the low temperature region and the standard temperature region is 10° C. However, this low temperature boundary temperature (T1) can also be from 5° C. to 15° C. The high temperature boundary temperature (T2) between the standard temperature region and the high temperature region is 45° C. However, the high temperature boundary temperature (T2) can also be from 40° C. to 60° C. At temperatures in a region below the low temperature region (for example, below 0° C.) or in a region above the high temperature region (for example, above 60° C.), charging can be suspended.

The over-charge protection voltage, which should never be exceeded by a charging battery, is set depending on the temperature region of the battery being charged. The over-charge protection voltage in the low temperature region and the high temperature region is set lower than the over-charge protection voltage in the standard temperature region. Further, the over-charge protection voltage in the low temperature region is set lower than the over-charge protection voltage in the high temperature region. As shown in FIG. 2, the maximum specified voltage in each temperature region is set somewhat lower, for example, from 20 mV to 100 mV lower, than the over-charge protection voltage setting in each temperature region. Specifically, the first maximum specified voltage (V1) for charging a battery in the low temperature region is set lower than the second maximum specified voltage (V2) for charging a battery in the standard temperature region. The third maximum specified voltage (V3) for charging a battery in the high temperature region is set lower than the second maximum specified voltage (V2). In addition, the first maximum specified voltage (V1) is set lower than the third maximum specified voltage (V3). However, the first maximum specified voltage (V1) can also be set higher than the third maximum specified voltage (V3). Finally, in the undesirable case where battery voltage exceeds the over-charge protection voltage, a protection measure is executed, such as switching off a charging cut-off device connected in series with the batteries, and charging is terminated.

The second maximum specified voltage (V2) is set to an optimum value for the type of lithium ion rechargeable battery. For cobalt-oxide lithium-carbon based lithium ion rechargeable batteries, the second maximum specified voltage (V2) is set 20 mV to 100 mV lower than the over-charge protection voltage, and is set, for example, 30 mV lower than 4.25V at 4.22V. However, the second maximum specified voltage (V2) can also be set in a range from 4.20V to 4.24V for this type of lithium ion battery. The first maximum specified voltage (V1) is set 20 mV to 100 mV lower than the over-charge protection voltage in the low temperature region, and is set, for example, at 4.03V. The third maximum specified voltage (V3) is set 20 mV to 100 mV lower than the over-charge protection voltage in the high temperature region, and is set, for example, at 4.13V.

However, the first maximum specified voltage (V1) and the third maximum specified voltage (V3) can also be set based on the second maximum specified voltage (V2). For example, the first maximum specified voltage (V1) can be set 30 mV to 300 mV lower than the second maximum specified voltage (V2). The third maximum specified voltage (V3) can be, set lower than the second maximum specified voltage (V2) and higher than the first maximum specified voltage (V1). In this case, the third maximum specified voltage (V3) can be set to make the voltage difference between the third maximum specified voltage (V3) and the second maximum specified voltage (V2) 30% to 80% of the voltage difference between the first maximum specified voltage (V1) and the second maximum specified voltage (V2).

The power reduction circuit 16 determines the maximum specified voltage from battery 3 temperature detected by the temperature detection circuit 8 and from data stored in the memory circuit 15. For example, if battery temperature is 20° C., the maximum specified voltage is set to a voltage lower than 4.25V, such as 4.22V. In addition, the power reduction circuit 16 compares the voltage of each battery cell 2 detected by the voltage detection circuit 6 with the maximum specified voltage. When the voltage of the highest voltage battery cell exceeds the maximum specified voltage, the power reduction circuit 16 controls the power supply circuit 4, which charges the battery array 1, to reduce its output. The power reduction circuit 16 controls power output by controlling the on and off duty cycle of the switching device 10 via the voltage feedback circuit 12 or the current feedback circuit 13.

When the voltage of the high voltage battery cell exceeds the maximum specified voltage, the power reduction circuit 16 reduces charging power by reducing the voltage for charging the battery array 1 by a prescribed ratio, or by reducing the set current by a prescribed ratio. Each time the voltage of the high voltage battery cell exceeds the maximum specified voltage, the power reduction circuit 16 reduces charging power by reducing charging voltage, for example, to 95% of its previous value. Otherwise, each time the voltage of the high voltage battery cell exceeds the maximum specified voltage, the power reduction circuit 16 reduces charging power by reducing the set current, for example, to 80% of its previous value. However, the power reduction circuit 16 can reduce charging voltage or set current by any ratio from 50% to 99% of the previous value.

Further, when the voltage of the high voltage battery cell exceeds the maximum specified voltage, the power reduction circuit 16 can determine the ratio for reducing the voltage or set current for charging the battery array 1 from the voltage difference between the maximum specified voltage and the battery cell voltage. Here, the maximum specified voltage is the maximum specified voltage for an individual battery cell multiplied by the number of series connected battery cells (three for the present embodiment), and the battery cell voltage is the sum of the voltage of each battery cell. When the voltage difference is large, the proportional reduction in the charging voltage or set current can be made large. For example, the power reduction circuit 16 can increase reduction in the amount of charging voltage or set current in proportion to the difference between the maximum specified voltage and the battery cell voltage.

Further, when the voltage of the high voltage battery cell exceeds the maximum specified voltage, the power reduction circuit 16 can determine the ratio for reducing the charging voltage or set current from the internal resistance of the battery cell that exceeded the maximum specified voltage. When battery cell internal resistance is large, the proportional reduction in the charging voltage or set current can be made large. The power reduction circuit 16 computes the internal resistance (R) of the high voltage battery cell from the charging voltage of the high voltage battery cell during charging (Ec), the charging current (I), and the open circuit voltage during suspension of charging (Eo) according to the equation below. The ratio for reduction of the charging voltage or set current is computed from the calculated internal resistance (R). For example, the power reduction circuit 16 can increase reduction in the amount of charging voltage or set current in proportion to the internal resistance (R).

$$R = (Ec - Eo)/I$$

Figure 3:
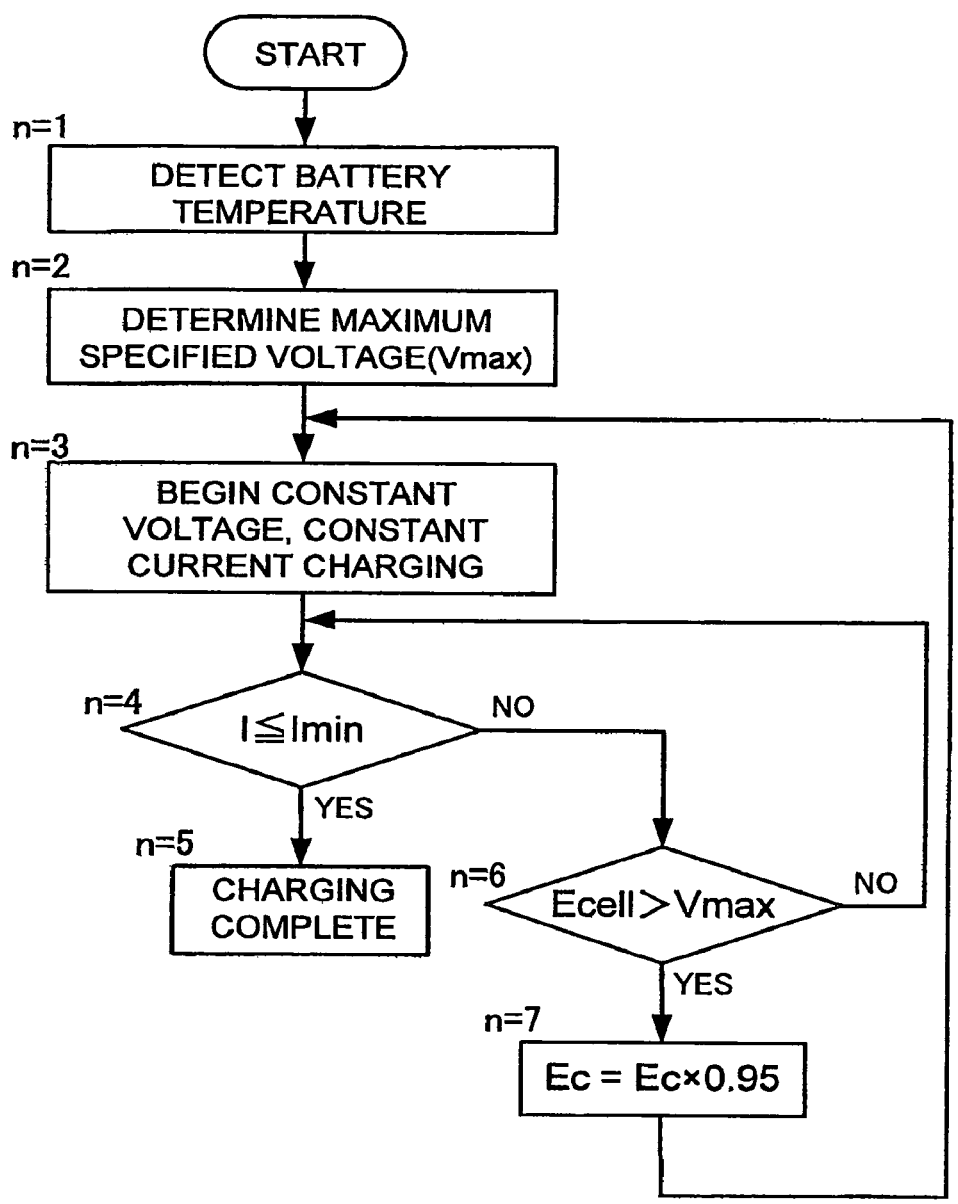
FIG. 3 is a flowchart showing one embodiment of the method of charging a battery array of the present invention.
Figure 4:
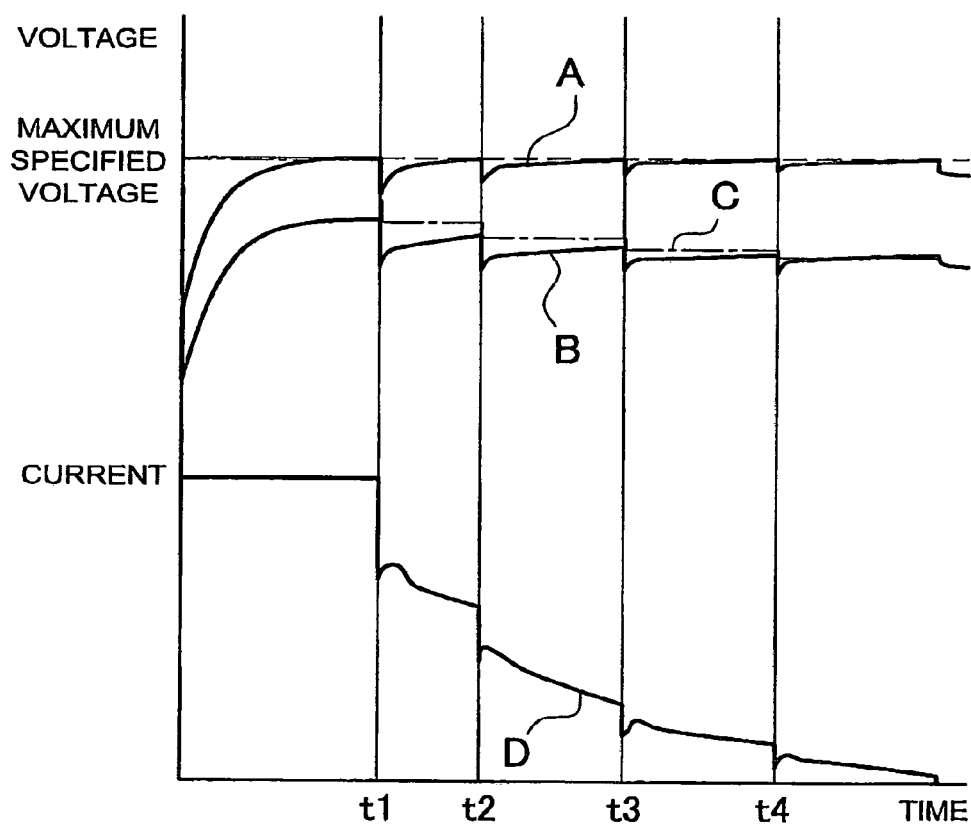
FIG. 4 is a graph showing voltage and current characteristics for batteries charged according to the steps shown in FIG. 3.

The charging circuit of FIG. 1 charges the battery array 1 by the following steps based on the flowchart shown in FIG. 3. This flowchart shows a method of charging that reduces charging voltage (Ec) for constant voltage, constant current charging of the battery array 1 when the voltage of the high voltage cell (Ecell) exceeds the maximum specified voltage (Vmax). FIG. 4 shows the voltage and current characteristics for batteries charged according to this flowchart. In FIG. 4, solid line A shows voltage variation for the high voltage battery cell; solid line B shows voltage variation for another battery cell; broken line C shows variation in the charging voltage (Ec) for constant voltage, constant current charging; and solid line D shows variation in the battery array charging current (I). Here, the charging voltage applied to the battery array 1 is equal to the charging voltage (Ec) of FIG. 4 times the number of series connected cells (three for the present embodiment).

[step n=1]
The temperature detection circuit 8 detects battery temperature.

[step n=2]
The maximum specified voltage (Vmax) is determined from the detected battery temperature.

[step n=3]
Constant voltage, constant current charging is started.

[step n=4, 5]
Charging current (I) is judged whether it is smaller than the minimum current (Imin). The minimum current (Imin) is set to the charging current of a battery array 1 in a fully charged state. Therefore, if battery array 1 charging current (I) drops below the minimum current (Imin), full charge is judged and charging is complete.

[step n=6]
If charging current (I) has not dropped below the minimum current (Imin), the voltage of the high voltage battery cell (Ecell) is compared with the maximum specified voltage (Vmax). Control loops through steps n=4 and n=6 until either the charging current (I) drops below the minimum current (Imin) or the voltage of the high voltage battery cell (Ecell) exceeds the maximum specified voltage (Vmax).

[step n=7]
When the voltage of the high voltage battery cell (Ecell) exceeds the maximum specified voltage (Vmax), charging power to the battery array 1 is reduced by reducing the charging voltage (Ec) with which the power supply circuit 4 charges the battery array 1. For example, charging voltage (Ec) is reduced to 95% of its previous value (for a power supply circuit 4 charging at 12.6V, charging voltage is reduced to approximately 12V). Control then returns to step 3.

Subsequently, control loops through steps n=3, 4, 6, and 7 until charging current (I) drops below the minimum current (Imin). Each time the voltage of the high voltage battery cell (Ecell) exceeds the maximum specified voltage (Vmax), the output voltage of the power supply circuit 4 for charging the battery array 1, which is the charging voltage (Ec), is reduced to 95% of its previous value.

In the case where charging voltage is reduced by a constant ratio, a lower limit is set for the charging voltage computed by multiplying the constant ratio times the previous voltage. This is because charging becomes impossible if the charging voltage becomes lower than the battery voltage. Therefore, if the charging voltage computed by multiplying the constant ratio becomes lower than the battery voltage, the charging voltage is set to the battery voltage. Here, the battery voltage is the sum of the voltage of each battery cell as described previously. As an alternate technique, each time the voltage of the high voltage battery cell (Ecell) exceeds the maximum specified voltage (Vmax) and charging voltage (Ec) is reduced, it can be set to the battery voltage, which is the sum of the voltage of each battery cell.

Figure 5:
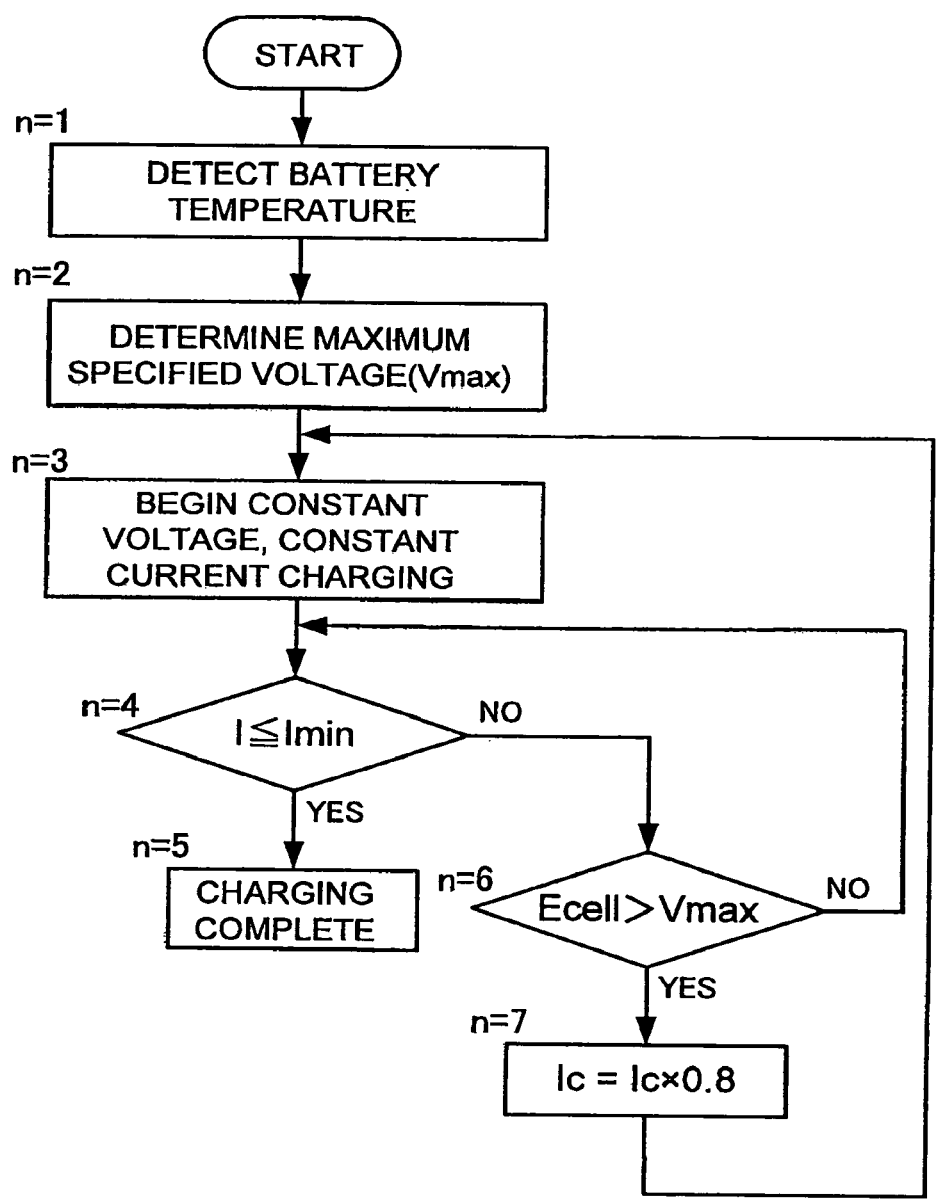
FIG. 5 is a flowchart showing another embodiment of the method of charging a battery array of the present invention.
Figure 6:
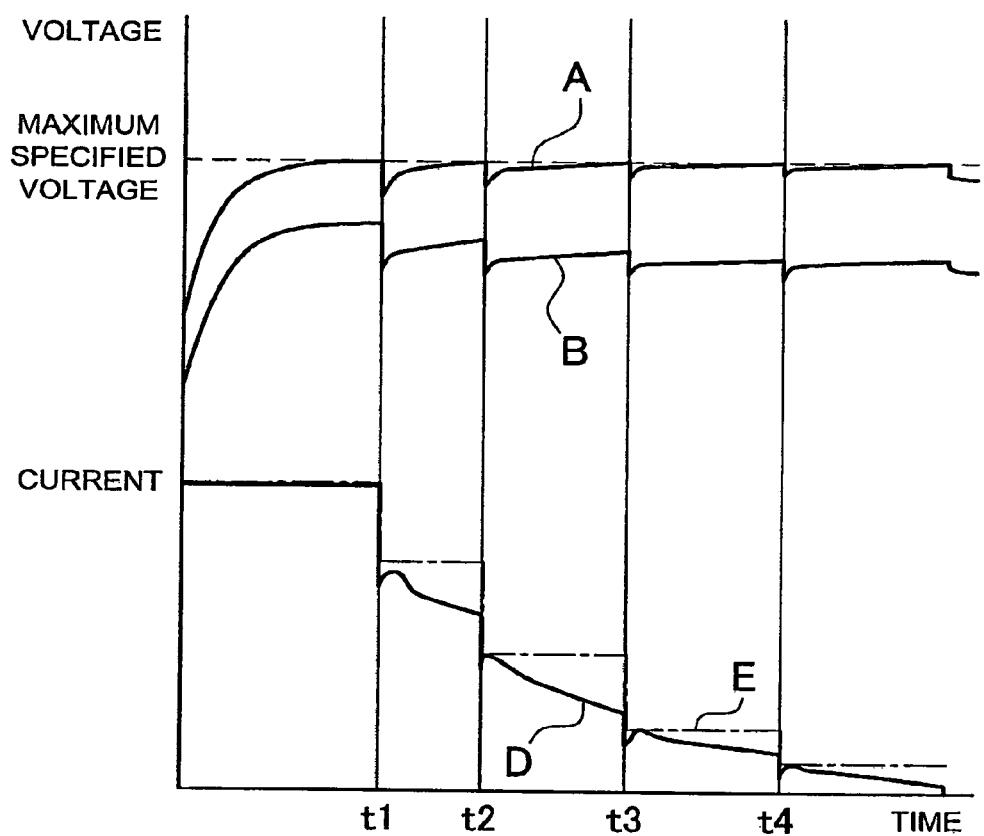
FIG. 6 is a graph showing voltage and current characteristics for batteries charged according to the steps shown in FIG. 5.

The flowchart of FIG. 5 shows a method of charging that reduces the set current (Ic) for constant voltage, constant current charging of the battery array 1 when the voltage of the high voltage cell (Ecell) exceeds the maximum specified voltage (Vmax). FIG. 6 shows the voltage and current characteristics for batteries charged according to this flowchart. In FIG. 6, solid line A shows voltage variation for the high voltage battery cell; solid line B shows voltage variation for another battery cell; solid line D shows variation in the battery array charging current (I); and broken line E shows variation in the set current (Ic) for constant voltage, constant current charging.

[step n=1]
The temperature detection circuit 8 detects battery temperature.

[step n=2]
The maximum specified voltage (Vmax) is determined from the detected battery temperature.

[step n=3]
Constant voltage, constant current charging is started.

[step n=4, 5]
Charging current (I) is judged whether it is smaller than the minimum current (Imin). The minimum current (Imin) is set to the charging current of a battery array 1 in a fully charged state. Therefore, if battery array 1 charging current (I) drops below the minimum current (Imin), full charge is judged and charging is complete.

[step n=6]
If charging current (I) has not dropped below the minimum current (Imin), the voltage of the high voltage battery cell (Ecell) is compared with the maximum specified voltage (Vmax). Control loops through steps n=4 and n=6 until either the charging current (I) drops below the minimum current (Imin) or the voltage of the high voltage battery cell (Ecell) exceeds the maximum specified voltage (Vmax).

[step n=7]
When the voltage of the high voltage battery cell (Ecell) exceeds the maximum specified voltage (Vmax), battery array 1 charging power is reduced by lowering the set current (Ic) for charging the battery array 1 with the power supply circuit 4. For example, the set current (Ic) is reduced to 80% of its previous value, and control then returns to step 3.

Subsequently, control loops through steps n=3, 4, 6, and 7 until charging current (I) drops below the minimum current (Imin). Each time the voltage of the high voltage battery cell (Ecell) exceeds the maximum specified voltage (Vmax), the set current (Ic) of the power supply circuit 4 is reduced to 80% of its previous value to charge the battery array 1.

If the value of the charging current computed from multiplying by a constant ratio becomes lower than the current setting for detecting full charge, full battery charge can be detected by mistake. Therefore, the current setting for detecting full charge is taken as the lower limit for the computed charging current.

Figure 7:
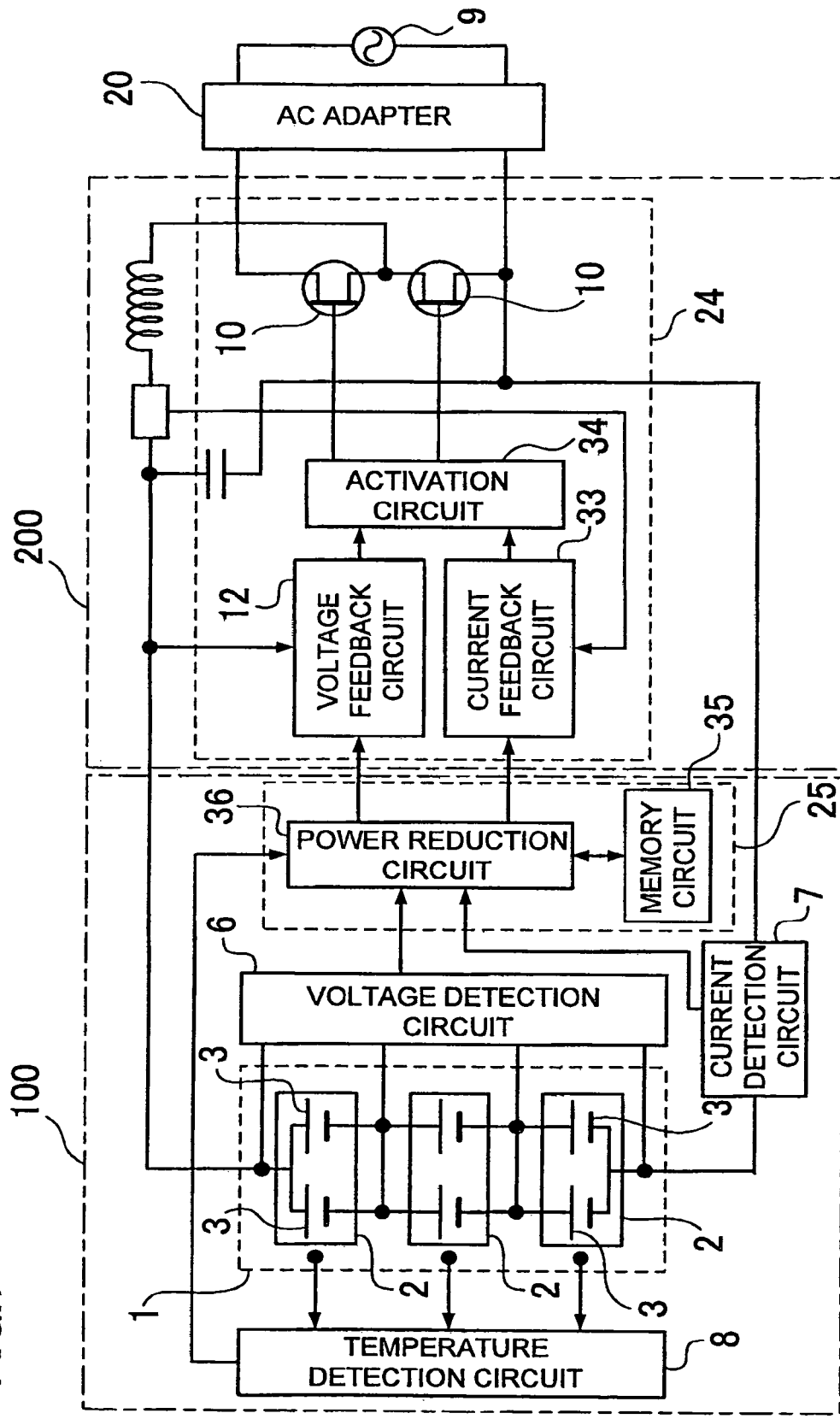
FIG. 7 is a block diagram showing an example of a charging circuit used in another embodiment of the method of charging a battery array of the present invention.

In the charging method of the present invention, battery temperature can be detected and the set current for charging the battery array can be determined from the detected temperature. FIG. 7 shows a charging circuit for implementing this. This figure shows a battery pack 100 provided with a battery array 1, which is a plurality of lithium ion rechargeable batteries 3, connected to electronic equipment 200, such as a personal computer, for charging. In FIG. 7, structural elements, which are the same as those of the previous embodiment shown in FIG. 1, are labeled the same and their detailed description is omitted.

The electronic equipment 200 of the figure is provided with a power supply circuit 24 for constant voltage, constant current charging of the battery array 1. In this electronic equipment 200, commercial power 9, which is 100V to 240V AC, is rectified to 16V to 20V DC by an AC adapter 20 and input to the power supply circuit 24. The power supply circuit 24 is a switching power supply with output controlled by the on and off duty cycle of switching devices 10. The battery pack 100 is provided with a control circuit 25 to control the charging voltage and set current for the power supply circuit 24 to charge the battery array 1. The temperature detection circuit 8 detects battery 3 temperature, and the set current for charging the battery array 1 is determined from the detected battery temperature and output to the electronic equipment-side. The control circuit 25 is provided with a memory circuit 35 that stores data to determine the set current from battery temperature, and a power reduction circuit 36 that determines the set current from battery temperature detected by the temperature detection circuit 8 and data stored in the memory circuit 35 and outputs it to the power supply circuit 24.

Figure 8:
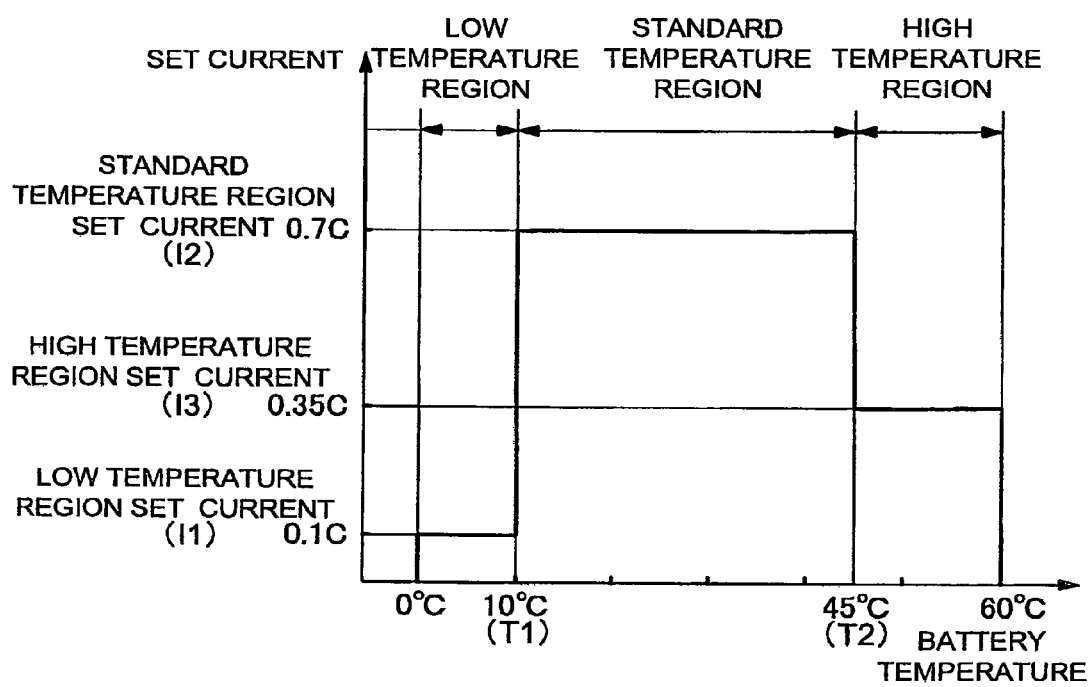
FIG. 8 is a graph showing specified current versus battery temperature.

FIG. 8 shows an example of data stored in the memory circuit 35. As shown in this figure, temperature of the battery being charged is separated into a low temperature region, a standard temperature region, and a high temperature region with a set current stored for each temperature region. The low temperature boundary temperature (T1) between the low temperature region and the standard temperature region is 10° C. However, this low temperature boundary temperature (T1) can also be from 5° C. to 15° C. The high temperature boundary temperature (T2) between the standard temperature region and the high temperature region is 45° C. However, the high temperature boundary temperature (T2) can also be from 40° C. to 60° C. At temperatures in a region below the low temperature region (for example, below 0° C.) or in a region above the high temperature region (for example, above 60° C.), charging can be suspended.

The set current for battery charging is set according to the battery temperature region. The set current in the low temperature region and in the high temperature region is set lower than the set current in the standard temperature region, and the set current in the low temperature region is set lower than the set current in the high temperature region. Specifically, the low temperature region set current (I1) for charging a battery in the low temperature region is set lower than the standard temperature region set current (I2) for charging a battery in the standard temperature region. The high temperature region set current (I3) for charging a battery in the high temperature region is set lower than the standard temperature region set current (I2). In addition, the low temperature region set current (I1) is set lower than the high temperature region set current (I3). However, the low temperature region set current (I1) can also be set higher than the high temperature region set current (I3). In FIG. 8, the set current in the standard temperature region is set to 0.7 C (it can be set in a range from 0.5 C to 1.2 C). The set current in the low temperature region is set to 0.1 C (set above the current for detection of full charge), and the set current in the high temperature region is set to 0.35 C (set to approximately half the set current in the standard temperature region).

The initial value of the charging current in each temperature region at the start of charging can be set by two parameters such as temperature and remaining capacity or temperature and voltage. For example, as shown in Table 1 and Table 2 below, set current can change in each temperature region depending on minimum detected battery voltage (battery voltage corresponding to battery capacity) or remaining capacity computed using well-known methods by a microcomputer housed in the battery pack (RSOC battery capacity). Here, for example in Table 1, A [V] can be 3.5V and B [V] can be 4.0V. In Table 2, C [%] can be 40% and D [%] can be 80%.

TABLE 1

| Battery voltage | Low temp. region | Standard temp. region | High temp. region |
|---|---|---|---|
| Below A [V] | 0.7 C. | 0.7 C. | 0.7 C. |
| At or above A [V] and below B [V] | 0.35 C. | 0.7 C. | 0.7 C. |
| At or above B [V] | 0.1 C. | 0.35 C. | 0.35 C. |

TABLE 2

| Remaining capacity (RSOC) | Low temp. region | Standard temp. region | High temp. region |
|---|---|---|---|
| Below C [%] | 0.7 C. | 0.7 C. | 0.7 C. |
| At or above C [%] and below D [%] | 0.35 C. | 0.7 C. | 0.7 C. |
| At or above D [%] | 0.1 C. | 0.35 C. | 0.35 C. |

The reason for adopting this type of set current dependence is primarily as follows. The reason is to prevent battery voltage rise above the maximum specified voltage and overcharge protection voltage, which are described in FIG. 2, due to high current when battery capacity is high and battery temperature is low.

The power reduction circuit 36 determines the set current for charging the battery array 1 from the battery temperature and data stored in the memory circuit 35. The power reduction circuit 36 determines the set current depending on the detected battery temperature to be the low temperature region set current (I1), the standard temperature region set current (I2), or the high temperature region set current (I3). The power reduction circuit 36 outputs a signal specifying the set current to the current feedback circuit 33 of the power supply circuit 24.

The power supply circuit 24 detects the signal input from the control circuit 25 and controls the maximum output current. The current feedback circuit 33 of the power supply circuit 24 is configured to switch the set current, which is the maximum output current, between three levels, which are the low temperature region set current (I1), the standard temperature region set current (I2), and the high temperature region set current (I3). Specifically, the power supply circuit 24 is configured to allow switching between preset multiple levels of set current. A power supply circuit 24, which can switch between multiple levels of set current, has a relatively simple structure and is inexpensive. A charging method that uses that power supply circuit is also simple and convenient. The signal specifying the set current as either the low temperature region set current (I1), the standard temperature region set current (I2), or the high temperature region set current (I3) is input to the current feedback circuit 33 of the power supply circuit 24 from the power reduction circuit 36. The current feedback circuit 33 controls the duty cycle of the switching devices 10 via an activating circuit 34, and controls the maximum output current to be the set current for charging the battery array 1. Specifically, the current feedback circuit 33 of the power supply circuit 24 switches the maximum output current to either the low temperature region set current (I1), the standard temperature region set current (I2), or the high temperature region set current (I3) to charge the battery array.

The control circuit 25 above detects battery temperature at the start of charging, determines the set current for charging the battery array 1 from the detected battery temperature, and outputs the result to the power supply circuit 24. The power supply circuit 24 detects the signal input from the control circuit 25, and charges the battery array while controlling the maximum value of the output current equal to the determined set current. In addition, the control circuit 25 detects battery temperature during charging of the battery array 1, determines the set current from the detected battery temperature, and outputs the result to the power supply circuit 24. The power supply circuit 24 detects the signal input from the control circuit 25, and controls the maximum value of the output current equal to the determined set current. However, when the set current determined from the battery temperature at the start of charging is different than the set current determined from the battery temperature during charging, the lower set current is selected to continue charging. For example, for a battery having temperature in the standard temperature region at the start of charging, charging is initiated with the standard temperature region set current (I2) as the set current. Subsequently, as charging progresses and battery temperature rises to the high temperature region, the set current is switched to the high temperature region set current (I3) and charging is continued. This is because the high temperature region set current (I3) is lower than the standard temperature region set current (I2). In contrast, for a battery having temperature in the low temperature region at the start of charging, charging is initiated with the low temperature region set current (I1) as the set current. Subsequently, as charging progresses and battery temperature rises to the standard temperature region, charging is continued without switching the set current to the standard temperature region set current (I2). This is because the low temperature region set current (I1) is lower than the standard temperature region set current (I2). In this manner, a charging method, which gives priority to the lower set current determined from the battery temperature at the start of charging and from the battery temperature during charging, can safely charge a battery array while reliably avoiding dangerous battery conditions.

The power reduction circuit 36 of the control circuit 25 also controls battery array 1 charging current by comparing battery voltage with the maximum specified voltage stored in the memory circuit 36. When the voltage of the high voltage battery cell exceeds the maximum specified voltage, the power reduction circuit 36 reduces charging power by reducing the set current for charging the battery array 1. When the voltage of the high voltage battery cell exceeds the maximum specified voltage, the power reduction circuit 36 outputs a signal to the current feedback circuit 33 of the power supply circuit 24 to reduce maximum output current, which is the set current, by one level in set current value. For example, if the present set current (Ic) is the standard temperature region set current (I2), it is reduced to the high temperature region set current (I3). If the present set current (Ic) is the high temperature region set current (I3), it is reduced to the low temperature region set current (I1). Namely, the power supply circuit 24 is controlled by the control circuit 25 to continue charging the battery array 1 while reducing the set current. When the voltage of the high voltage battery cell exceeds the maximum specified voltage, the set current for charging the battery array 1 is reduced, and the reduced set current is the predetermined set current, which is a function of battery temperature. Specifically, the set current is the current that is preset in multiple levels. The set current described above has three levels of set current that are (I2), (I3), and (I1). However, for multiple levels of set current greater than three, when the voltage of the high voltage battery cell exceeds the maximum specified voltage for the present battery temperature, the maximum output current, which is the set current, can be reduced to a set current one level lower.

During continued charging of the battery array 1, a set current is determined for the temperature region of the detected battery temperature during charging, and a set current is determined for reducing charging current when the high voltage battery cell exceeds the maximum specified voltage. In this case, the control circuit 25 gives priority to the lower set current and continues charging the battery array with that set current.

Figure 9:
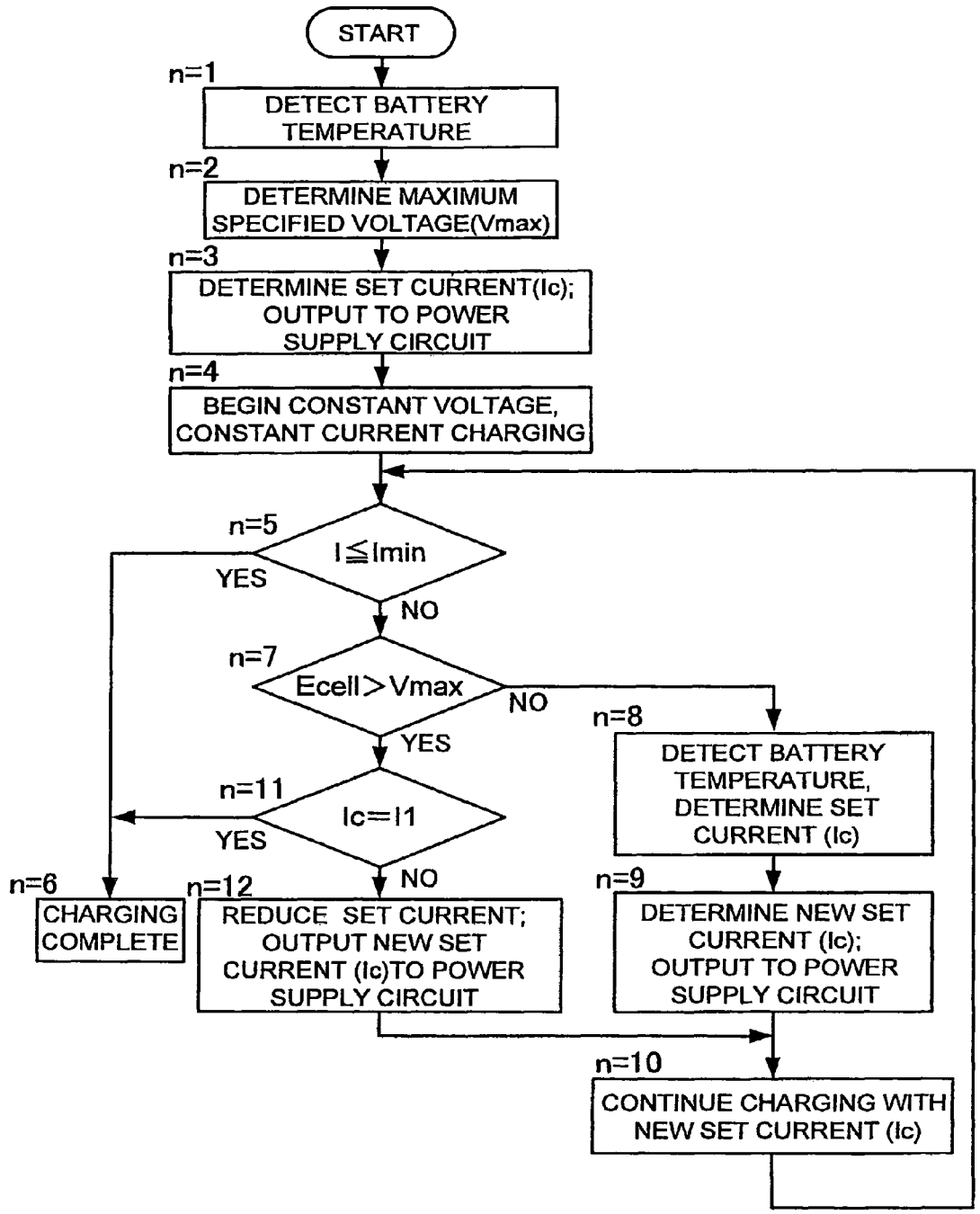
FIG. 9 is a flowchart showing another embodiment of the method of charging a battery array of the present invention.
Figure 10:
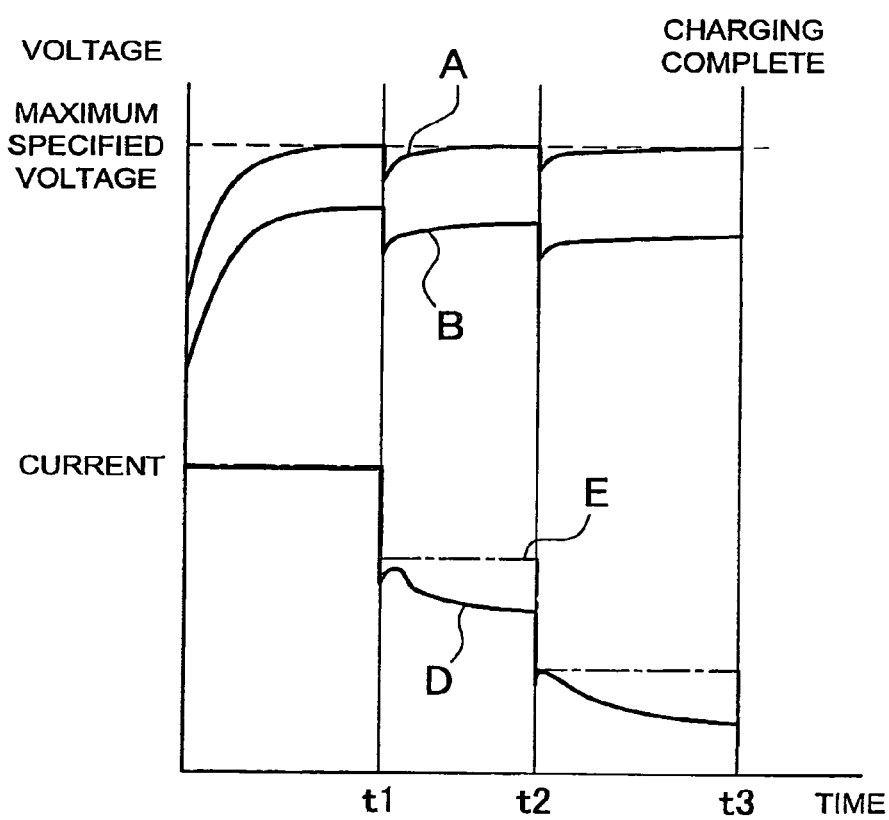
FIG. 10 is a graph showing voltage and current characteristics for batteries charged according to the steps shown in FIG. 9.

The charging circuit of FIG. 7 charges the battery array 1 by the following steps based on the flowchart shown in FIG. 9. As shown in this flowchart, when the voltage of the high voltage cell (Ecell) exceeds the maximum specified voltage (Vmax), the charging circuit reduces the set current (Ic) for constant voltage, constant current charging of the battery array 1. FIG. 10 shows the voltage and current characteristics for batteries charged according to this flowchart. In FIG. 10, solid line A shows voltage variation for the high voltage battery cell; solid line B shows voltage variation for another battery cell; solid line D shows variation in the battery array charging current (I); and broken line E shows variation in the set current (Ic) for constant voltage, constant current charging.

[step n=1]
The temperature detection circuit 8 detects battery temperature.

[step n=2]
The control circuit 25 determines the maximum specified voltage (Vmax) from the detected battery temperature.

[step n=3]
The control circuit 25 determines the set current (Ic) for battery charging from the detected battery temperature and outputs it to the power supply circuit 24. The control circuit 25 determines the set current (Ic) from battery temperature based on data stored in the memory circuit. As shown in FIG. 8, the set current (Ic) is determined according to the temperature region to be the low temperature region set current (I1), the standard temperature region set current (I2), or the high temperature region set current (I3).

[step n=4]
Begin charging the battery array 1. The power supply circuit 24 charges the battery array 1 by constant voltage, constant current charging while controlling maximum output current to be the set current (Ic) determined in step n=3.

[step n=5, 6]
Charging current (I) is judged whether it is smaller than the minimum current (Imin). The minimum current (Imin) is set to the charging current of a battery array 1 in a fully charged state. Therefore, if battery array 1 charging current (I) drops below the minimum current (Imin), full charge is judged and charging is complete.

[step n=7]
If charging current (I) has not dropped below the minimum current (Imin), the control circuit 25 compares the voltage of the high voltage battery cell (Ecell) with the maximum specified voltage (Vmax).

[step n=8]
If the voltage of the high voltage battery cell (Ecell) is at or below the maximum specified voltage (Vmax), the temperature detection circuit 8 detects battery temperature and the set current (Ic) is determined from the detected battery temperature.

[step n=9]

The control circuit 25 determines a new set current (Ic) from the present set current (Ic) and the set current (Ic) determined in step n=8. For example, if the present set current (Ic) is the value determined in step n=3, a new set current (Ic) is determined from the values determined in steps n=3 and n=8. If the present set current (Ic) and the value determined in step n=8 are the same, the control circuit 25 outputs that value as the new set current (Ic) to the power supply circuit 24. If the present set current and the set current determined step n=8 are different, the control circuit 25 outputs the lower value as the new set current (Ic) to the power supply circuit 24.

[step n=10]

The power supply circuit 24 continues charging while controlling maximum output current to be the new set current (Ic) determined in step n=9. Subsequently, control returns to step n=5.

[step n=11]

If the voltage of the high voltage battery cell (Ecell) exceeds the maximum specified voltage (Vmax), this step judges if the present set current (Ic) has dropped to the lowest set current, which is the low temperature region set current (I1). If the present set current (Ic) is equal to the low temperature region set current (I1), the set current (Ic) cannot be reduced further and control proceeds to step n=6 where charging is complete.

[step n=12]

When the present set current (Ic) is not equal to the low temperature region set current (I1), set current (Ic) is judged to be greater than the low temperature region set current (I1), and its value is lowered one level. Specifically, if the present set current (Ic) is the standard temperature region set current (I2), the set current (Ic) is lowered to the high temperature region set current (I3). If the present set current (Ic) is the high temperature region set current (I3), it is lowered to the low temperature region set current (I1). The control circuit 25 outputs a set current reduced by one level as the new set current (Ic) to the power supply circuit 24. Subsequently, control proceeds to step n=10 and battery array 1 charging is continued.

In the embodiment described above, battery voltage is detected and current is reduced when battery voltage rises to a maximum specified voltage. However, the current setting is the set current for the low temperature region, the standard temperature region, or the high temperature region. Since the current values for controlling current based on battery temperature, and the current values that change as battery voltage rises, interchange over the same set of values, circuit structure can be simple. The set current for battery charging is configured to switch among three levels depending on battery temperature (in the low temperature region, the standard temperature region, or the high temperature region). However, in the method of charging of the present invention, set current dependence on battery temperature can also be in two levels or in four or more levels.

Figure 11:
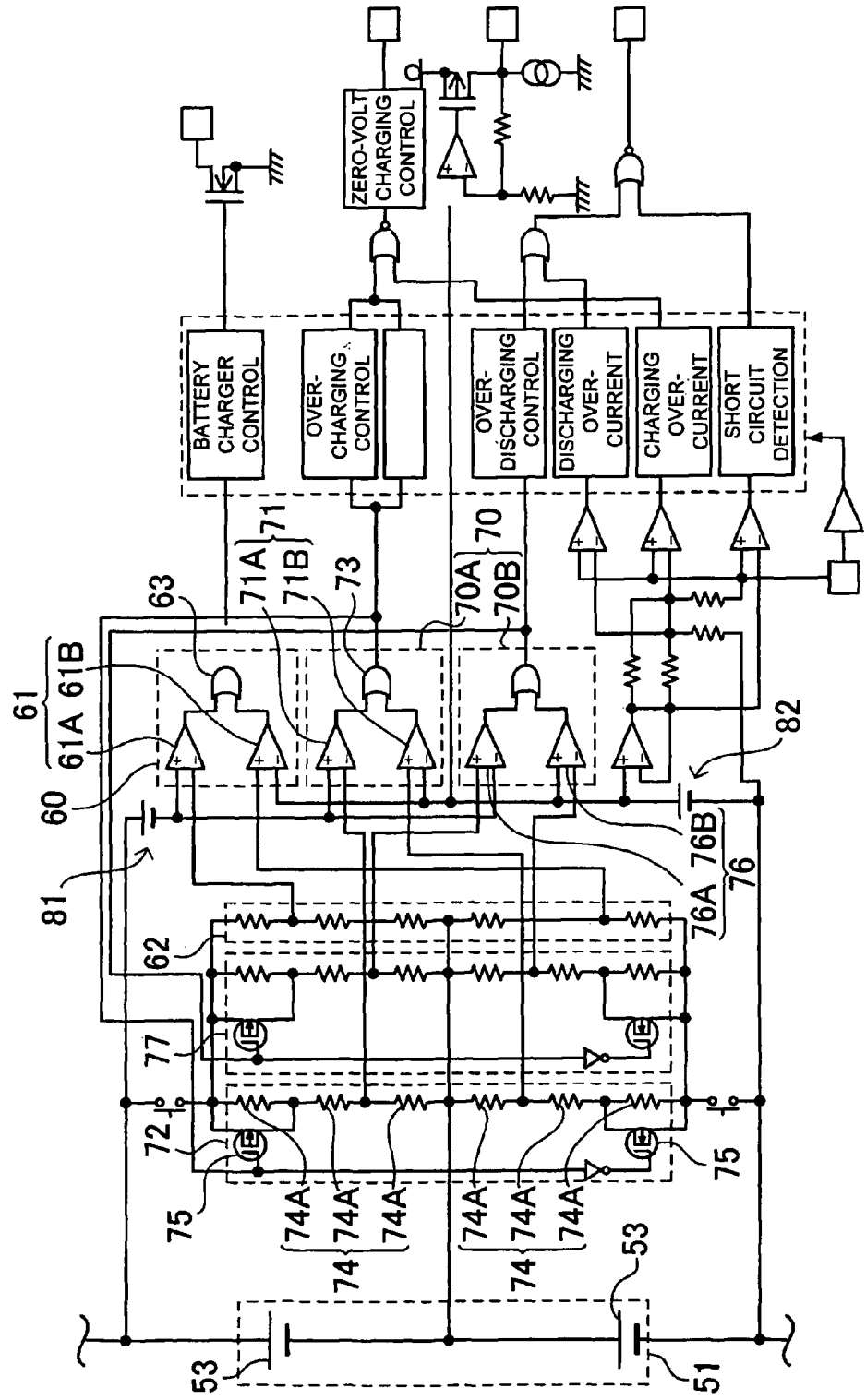
FIG. 11 is a circuit diagram showing an example of a circuit to detect battery array over-charging and over-discharging.

In addition, a battery pack can control current and voltage without converting battery current and voltage to digital signals. As shown in the circuit diagram of FIG. 11, current and voltage can be controlled by comparing a detection signal of battery current or voltage with a reference voltage via a difference amplifier. To detect voltage of the battery 53 being charged and prevent over-charging, the battery pack of FIG. 11 is provided with a maximum voltage detection circuit 60, a set voltage detection circuit 70, and reference voltage circuits 81, 82 to supply reference voltage to the maximum voltage detection circuit 60 and the set voltage detection circuit 70.

Since the battery pack of the figure has a battery array 51 with two battery cells connected in series, the maximum voltage detection circuit 60 is provided with two difference amplifiers 61 to detect positive-side battery cell 53 voltage and negative-side battery cell voltage. The negative-side difference amplifier 61B has the reference voltage from the reference voltage circuit 82 input to its inverting input terminal, and has its non-inverting input terminal connected to the negative-side battery cell 53 via a voltage divider 62. This negative-side difference amplifier 61B issues a maximum voltage signal when the voltage of the negative-side battery cell 53 exceeds the maximum voltage. The positive-side difference amplifier 61A has the reference voltage from the reference voltage circuit 81 input to its non-inverting input terminal, and has its inverting input terminal connected to the positive-side battery cell 53 via a voltage divider 62. This positive-side difference amplifier 61A issues a maximum voltage signal when the voltage of the positive-side battery cell 53 exceeds the maximum voltage. For example, if the battery pack has lithium ion rechargeable battery cells, the voltage dividers 62 and reference voltages are set for the difference amplifiers 61 to issue maximum voltage signals when the positive-side or negative-side battery cell 53 voltage exceeds 4.25V.

Output from the positive-side difference amplifier 61A and the negative-side difference amplifier 61B is input to an OR circuit 63. If either battery cell 53 exceeds the maximum voltage (4.25V for lithium ion rechargeable batteries), the OR circuit 63 issues a maximum voltage signal to a battery charger (not illustrated) and charging is stopped. In addition, this signal can be used to reduce charging voltage or current as described previously.

The set voltage detection circuit 70 is provided with a set voltage detection circuit for charging 70A to detect battery 53 over-charging, and a set voltage detection circuit for discharging 70B to detect battery 53 over-discharging. The set voltage detection circuit for charging 70A is provided with two difference amplifiers 71 to detect the set voltage of the positive-side battery cell 53 and the negative-side battery cell 53. The negative-side difference amplifier 71B has the reference voltage from the reference voltage circuit 82 input to its inverting input terminal, and has its non-inverting input terminal connected to the negative-side battery cell 53 via a variable voltage divider 72. This negative-side difference amplifier 71B issues a voltage signal when the voltage of the negative-side battery cell 53 exceeds the set voltage. The positive-side difference amplifier 71A has the reference voltage from the reference voltage circuit 81 input to its non-inverting input terminal, and has its inverting input terminal connected to the positive-side battery cell 53 via a variable voltage divider 72. This positive-side difference amplifier 71A issues a voltage signal when the voltage of the positive-side battery cell 53 exceeds the set voltage.

The variable voltage divider 72 can change the ratio of the voltage divider for reducing battery cell 53 voltage for input to a difference amplifier 71. Consequently, a charge controlling difference amplifier 71 can detect and issue a signal for a first set voltage and for a second set voltage, which is lower than the first set voltage. For example, the first set voltage can be the maximum specified voltage in the standard temperature region (4.22V in FIG. 2), and the second set voltage can be the maximum specified voltage in the high temperature region or in the low temperature region (4.13V or 4.03V in FIG. 2).

The variable voltage divider 72 of FIG. 11 can change the voltage divider ratio by short-circuiting a voltage divider resistor 74 via a switching device 75. A variable voltage divider 72 of the figure has three resistors 74A connected in series, and a switching device 75 is connected in parallel with one of those resistors 74A. The switching device 75 adjusts the voltage divider ratio by short-circuiting across the terminals of one resistor 74A. In the variable voltage divider 72 of the figure, the voltage divider ratio is reduced by turning the switching device 75 off, and the voltage divider ratio is increased by turning the switching device 75 on. Here, a higher voltage divider ratio means more voltage division or greater reduction in voltage. Namely, the voltage divider ratio for inputting battery cell 53 voltage to a difference amplifier 71 can be changed by switching the switching device 75 on or off. For example, the resistance of voltage divider resistors 74A can be set to allow a difference amplifier 71 to output a voltage signal for the first set voltage with the switching device 75 on, and allow a difference amplifier 71 to output a voltage signal for the second set voltage with the switching device 75 off.

Since the set voltage detection circuit for charging 70A has a variable voltage divider 72 connected to its input-side, it can detect and output a voltage signal for the first set voltage and for the second set voltage. Here, the first or second set voltage is set by the variable voltage divider 72. With the switching device 75 off, the set voltage detection circuit for charging 70A detects the lower second set voltage and issues a HIGH output, then with the switching device 75 on, it detects the higher first set voltage.

The set voltage detection circuit for charging 70A, which detects over-charging of the battery 53, is provided with a negative-side difference amplifier 71B connected to the negative-side of the battery 53, and a positive-side difference amplifier 71A connected to the positive-side of the battery 53. The negative-side difference amplifier 71B has the reference voltage from the reference voltage circuit 82 input to its inverting input terminal, and has its non-inverting input terminal connected to the negative-side battery cell 53 via a variable voltage divider 72.

When the voltage of the negative-side battery cell 53 exceeds the set voltage, the negative-side difference amplifier 71B issues a second output signal to indicate this. Since this second output signal indicates battery 53 voltage has exceeded the set voltage, a charging switching device (not illustrated) provided in series with the battery array 51 is shut off via this signal (or charging voltage or current can be reduced). Since the second set voltage is set, for example, to the maximum specified voltage in the high temperature region or low temperature region (4.13V or 4.03V in FIG. 2), charging is stopped via this signal for a battery 53 being charged in the high or low temperature region. The second output signal switches on the switching device 75 and increases the voltage divider ratio of the variable voltage divider 72. This lowers the voltage at the input of the difference amplifier 71, and consequently, the difference amplifier 71 stops issuing the second output signal. For a battery in the standard temperature region, charging is not stopped by the second output signal, charging is continued, and battery voltage increases. When battery 53 voltage exceeds the first set voltage, the difference amplifier 71 issues a first output signal to indicate the first set voltage has been exceeded. Since the first set voltage is set, for example, to the maximum specified voltage in the standard temperature region (4.22V in FIG. 2), charging is stopped via this signal for a battery 53 being charged in the standard temperature region.

The positive-side difference amplifier 71A has the reference voltage from the reference voltage circuit 81 input to its non-inverting input terminal, and has its inverting input terminal connected to the positive-side battery cell 53 via a variable voltage divider 72. This positive-side difference amplifier 71A controls battery 63 charging in the same manner as the negative-side difference amplifier 71B. The positive-side difference amplifier 71A issues a second voltage signal when the voltage of the positive-side battery cell 53 exceeds the second set voltage, and it issues a first voltage signal when the voltage of the positive-side battery cell 53 exceeds the first set voltage Output from the positive-side difference amplifier 71A and the negative-side difference amplifier 71B is input to an OR circuit 73. If either battery cell 53 exceeds the first set voltage or the second set voltage, the OR circuit 73 issues a signal for controlling battery 53 charging, which indicates the first or second set voltage has been exceeded. In a battery pack with a plurality of battery cells connected in series, charging is stopped if the voltage of any battery 53 exceeds the maximum specified voltage. Consequently, if the voltage of any battery 53 exceeds the first set voltage or the second set voltage, charging is stopped. Specifically, a charging switching device (not illustrated) provided in series with the battery array 51 is shut off via this signal and charging is stopped.

The set voltage detection circuit for discharging 70B, which detects over-discharging of the battery 53, is provided with a negative-side difference amplifier 76B connected to the negative-side of the battery 53, and a positive-side difference amplifier 76A connected to the positive-side of the battery 53. The negative-side difference amplifier 76B has the reference voltage from the reference voltage circuit 82 input to its non-inverting input terminal, and has its inverting input terminal connected to the negative-side battery cell 53 via a variable voltage divider 77. The positive-side difference amplifier 76A has the reference voltage from the reference voltage circuit 81 input to its inverting input terminal, and has its non-inverting input terminal connected to the positive-side battery cell 53 via a variable voltage divider 77.

For the set voltage detection circuit for discharging 70B, which controls over-discharging, battery cell 53 voltage is also input to a difference amplifier 76 via a variable voltage divider 77. Consequently, the set voltage detection circuit for discharging 70B can also control discharging for two set voltages. Further, a negative-side difference amplifier 76B for detecting the voltage of the negative-side battery 53, and a positive-side difference amplifier 76A for detecting the voltage of the positive-side battery 53 are provided. Consequently, the voltage of both the negative-side battery 53 and the positive-side battery 53 can be compared with the set voltage, and discharging can be controlled when the voltage of either battery 53 is detected to drop below the set voltage. Specifically, a discharging switching device (not illustrated) provided in series with the battery array 51 is shut off via an under-voltage signal and discharging is stopped.

Figure 12:
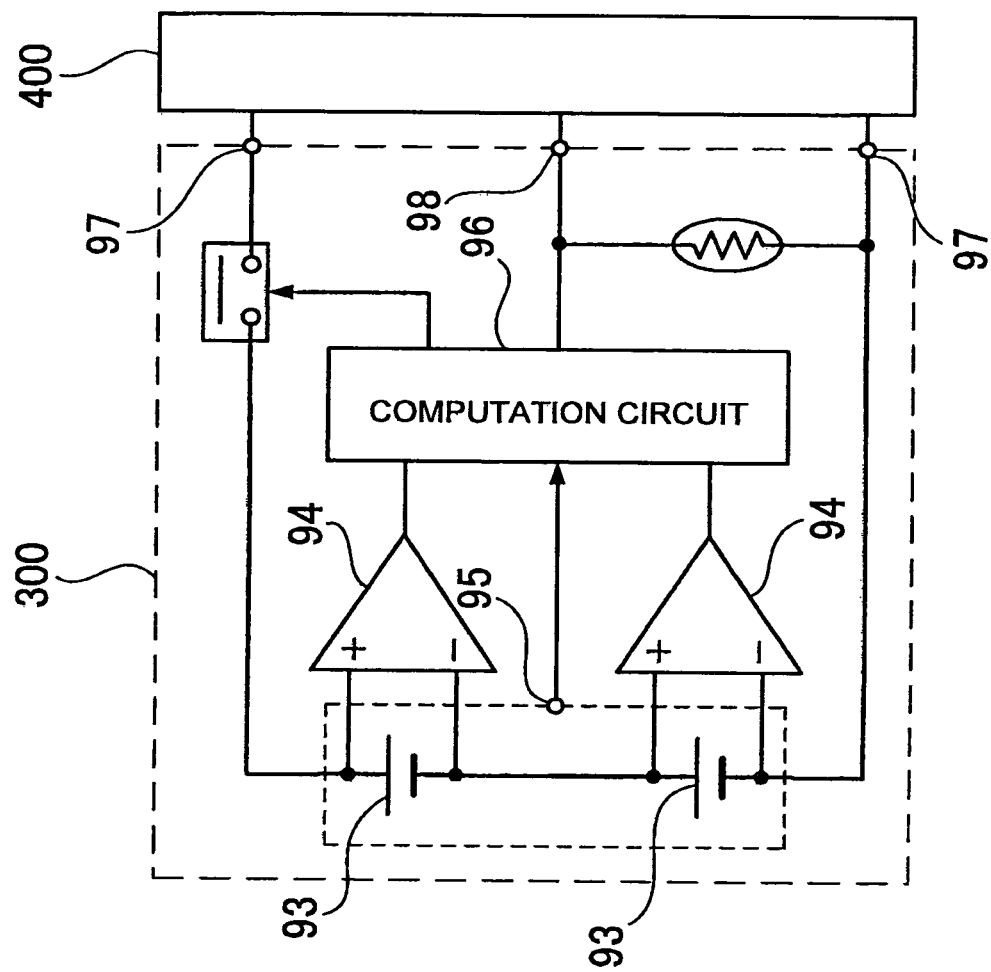
FIG. 12 is a block diagram showing an example of a battery pack that determines the temperature region for a given battery temperature.
Figure 13:
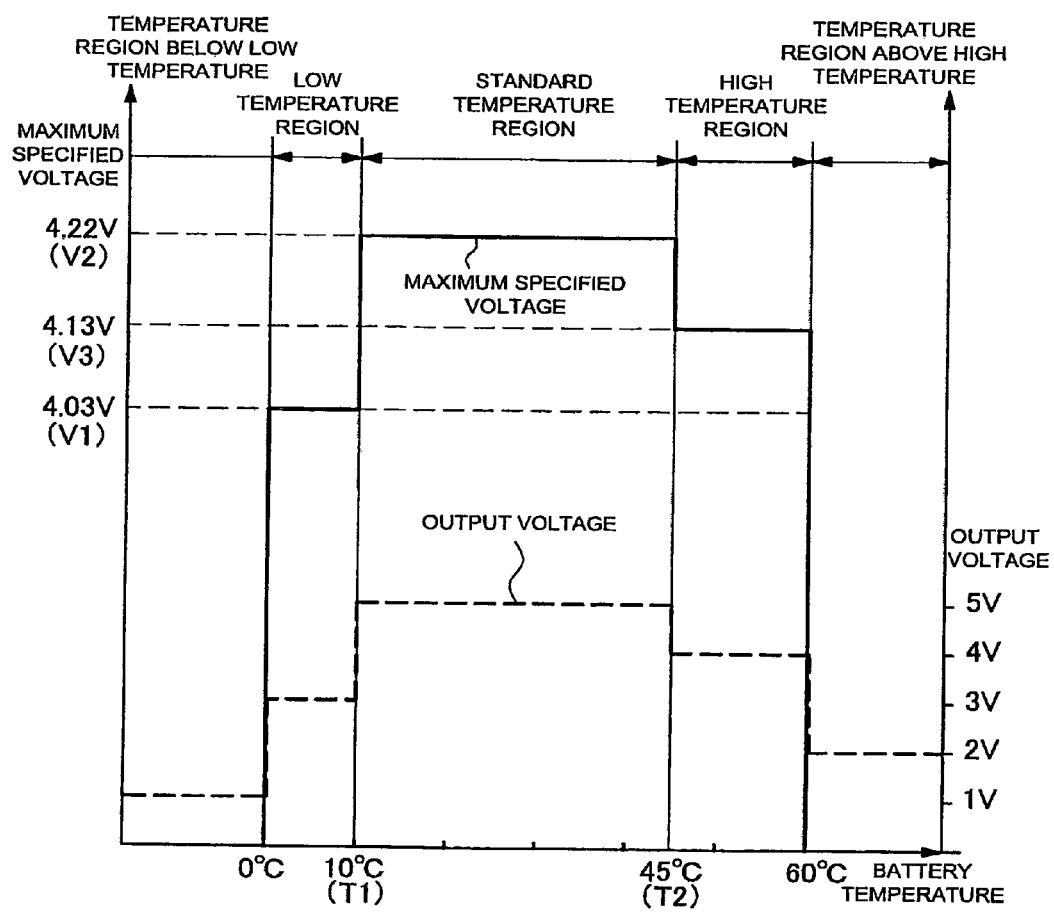
FIG. 13 is a graph showing an example of specified voltage versus battery temperature.

The battery pack 300 shown in the circuit diagram of FIG. 12 has positive and negative output terminals 97 and a communication terminal 98. A voltage signal corresponding to battery 93 temperature is output from the communication terminal 98. This battery pack is provided with voltage detection circuits 94 to detect the voltage of each battery 93, a temperature sensor 95 to detect battery 93 temperature, and a computation circuit 96 to operate on signals input from the temperature sensor 95 and the voltage detection circuits 94 and output a voltage signal corresponding to battery 93 temperature. The computation circuit 96 detects battery 93 temperature from the temperature signal input from the temperature sensor 95. As shown in FIG. 13, the computation circuit 96 determines which temperature region the detected temperature is in: the temperature region below low temperature, the low temperature region, the standard temperature region, the high temperature region, or the temperature region above high temperature. In FIG. 13, the value of the maximum specified voltage varies appropriately with temperature in the same manner shown in previously described FIG. 2. The vertical axes of FIG. 13 show maximum specified voltage and output voltage from the communication terminal 98 for each temperature region.

For batteries 93 with temperature in the low temperature region during charging, the computation circuit 96 judges whether battery 93 voltage is greater than the first maximum specified voltage (V1) (4.03V in FIG. 13). If battery 93 voltage is greater than the first maximum specified voltage (V1), the computation circuit 96 issues a voltage signal corresponding to the low temperature region (3V in FIG. 13) from the communication terminal 98. For batteries 93 with temperature in the standard temperature region, the computation circuit 96 judges whether battery 93 voltage is greater than the second maximum specified voltage (V2) (4.22V in FIG. 13). If battery 93 voltage is greater than the second maximum specified voltage (V2), the computation circuit 96 issues a voltage signal corresponding to the standard temperature region (5V in FIG. 13) from the communication terminal 98. For batteries 93 with temperature in the high temperature region, the computation circuit 96 judges whether battery 93 voltage is greater than the third maximum specified voltage (V3) (4.13V in FIG. 13). If battery 93 voltage is greater than the third maximum specified voltage (V3), the computation circuit 96 issues a voltage signal corresponding to the high temperature region (4V in FIG. 13) from the communication terminal 98. If the batteries 93 have a temperature below the low temperature region, the computation circuit 96 issues a voltage signal corresponding to the temperature region below low temperature (1V in FIG. 13) from the communication terminal 98. If the batteries 93 have a temperature above the high temperature region, the computation circuit 96 issues a voltage signal corresponding to the temperature region above high temperature (2V in FIG. 13) from the communication terminal 98.

In addition to detecting whether the voltage of each battery 93 exceeds the set voltage, electronic equipment 400 connected with the battery pack 300 can determine which temperature region corresponds to the battery 93 temperature via the voltage signal input from a single communication terminal 98. Specifically, electronic equipment 400 can determine whether battery 93 temperature is in the temperature region below low temperature, the low temperature region, the standard temperature region, the high temperature region, or the temperature region above high temperature. When the voltage of any battery cell exceeds the maximum specified voltage, battery 93 charging can be stopped, charging power can be reduced, charging voltage can be lowered, or the set charging current can be reduced.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2007-184481 filed in Japan on Jul. 13, 2007 and No. 2008-5036 filed in Japan on Jan. 11, 2008, the content of which is incorporated herein by reference.

What is claimed is:

1. A method of charging a battery array that performs constant current and constant voltage charging of a battery array, which is a plurality of series connected batteries, while detecting the voltage of each battery, the method comprising:
   detecting a voltage of each of a plurality of battery cells of a battery array at a prescribed sampling rate; and
   performing a constant current and constant voltage charging of all the plurality of battery cells of the battery array at a same reduced charging power when a voltage of any battery cell of the battery array exceeds a maximum specified voltage,
   wherein the maximum specified voltage changes with battery temperature, and
   wherein a maximum specified voltage for battery charging in a low temperature region is set lower than a maximum specified voltage for battery charging in a standard temperature region.

2. The method of claim 1, wherein the plurality of series connected batteries of the battery array are lithium ion rechargeable batteries.

3. The method of claim 1, wherein the voltage of each battery cell of the battery array is detected at a prescribed sampling rate, and when the voltage of any battery cell exceeds a preset maximum specified voltage, a charging voltage is reduced for performing constant current and constant voltage charging of the battery array.

4. The method of claim 3, wherein when the voltage of any battery cell of the battery array exceeds the maximum specified voltage, a voltage for charging the battery array is reduced by a prescribed ratio.

5. The method of claim 3, wherein when the voltage of any battery cell of the battery array exceeds the maximum specified voltage, the voltage for charging the battery array is reduced, and a ratio for reducing the charging voltage is determined from a voltage difference between the maximum specified voltage and a voltage of a battery cell, and when the voltage difference is large, the ratio for reducing the charging voltage is made large.

6. The method of claim 3, wherein when the voltage of any battery cell of the battery array exceeds the maximum specified voltage, the voltage for charging the battery array is reduced, and a ratio for reducing the charging voltage is determined from an internal resistance of a battery cell that exceeded a maximum specified voltage, and when battery cell internal resistance is large, the ratio for reducing the charging voltage is made large.

7. The method of claim 3, wherein when the voltage of any battery cell of the battery array exceeds the maximum specified voltage, the voltage for charging the battery array is reduced to a battery voltage, which is a sum of the voltages of each battery cell.

8. The method of claim 1, wherein the voltage of each battery cell is detected at a prescribed sampling rate, when the voltage of any battery cell of the battery array exceeds a preset maximum specified voltage, a set current is reduced for performing constant current and constant voltage charging of the battery array.

9. The method of claim 8, wherein when the voltage of any battery cell of the battery array exceeds the maximum specified voltage, the set current for charging the battery array is reduced by a prescribed ratio.

10. The method of claim 8, wherein when the voltage of any battery cell of the battery array exceeds the maximum specified voltage, the set current for charging the battery array is reduced, and a ratio for reducing the set current is determined from a voltage difference between the maximum specified voltage and a voltage of the battery cell, and when the voltage difference is large, the ratio for reducing the set current is made large.

11. The method of claim 8, wherein when the voltage of any battery cell of the battery array exceeds the maximum specified voltage, the set current for charging the battery array is reduced, and a ratio for reducing the set current is determined from an internal resistance of a battery cell that exceeded the maximum specified voltage, and when battery cell internal resistance is large, the ratio for reducing the set current is made large.

12. The method of claim 1, wherein the maximum specified voltage is set in a range from 4.20V to 4.24V.

13. The method of claim 1, wherein the maximum specified voltage in the low temperature region is set from 30 mV to 300 mV lower than the maximum specified voltage in the standard temperature region.

14. The method of claim 1, wherein a maximum specified voltage for battery charging in a high temperature region is set lower than a maximum specified voltage for battery charging in a standard temperature region.

15. A method of charging a battery array that performs constant current and constant voltage charging of a battery array, which is plurality of series connected batteries, while detecting the voltage of each battery, the method comprising:
    detecting a voltage of each of a plurality of battery cells of a battery array at a prescribed sampling rate; and
    performing a constant current and constant voltage charging of all the plurality of battery cells of the battery array at a same reduced charging power when a voltage of any battery cell of the battery array exceeds a maximum specified voltage,
    wherein the maximum specified voltage changes with battery temperature, and
    wherein a maximum specified voltage in a high temperature region is set lower than a maximum specified voltage in a standard temperature region, and is set higher than the maximum specified voltage in a low temperature region.

16. The method of claim 15, wherein the maximum specified voltage in the high temperature region is set to make a voltage difference between the maximum specified voltage in the high temperature region and the maximum specified voltage in the standard temperature region 30% to 80% of a voltage difference between the maximum specified voltage in the low temperature region and the maximum specified voltage in the standard temperature region.

17. The method of claim 8, wherein the set current changes with battery temperature.

18. The method of claim 17, wherein reduction in set current is in accordance with multiple levels of a prescribed set current.

19. The method of claim 1, wherein the charging power for charging the battery cells is reduced according to output from a difference amplifier which compares a reference voltage with the voltage of the battery cell.

20. The method of claim 19,
    wherein the difference amplifier comprises a positive-side difference amplifier to which a positive-side battery cell voltage is input, and a negative-side difference amplifier to which a negative-side battery cell voltage is input, and
    wherein the charging power for charging the plurality of battery cells is reduced according to a signal issued by an OR circuit to which each output of the positive-side difference amplifier and the negative-side difference amplifier is input.

21. The method of claim 15, wherein the plurality of series connected batteries of the battery array are lithium ion rechargeable batteries.

22. The method of claim 15, wherein the voltage of each battery cell of the battery array is detected at a prescribed sampling rate, and when the voltage of any battery cell exceeds a preset maximum specified voltage, a charging voltage is reduced for performing constant current and constant voltage charging of the battery array.

23. The method of claim 22, wherein when the voltage of any battery cell of the battery array exceeds the maximum specified voltage, a voltage for charging the battery array is reduced by a prescribed ratio.

24. The method of claim 22, wherein when the voltage of any battery cell of the battery array exceeds the maximum specified voltage, the voltage for charging the battery array is reduced, and a ratio for reducing the charging voltage is determined from a voltage difference between the maximum specified voltage and a voltage of a battery cell, and when the voltage difference is large, the ratio for reducing the charging voltage is made large.

25. The method of claim 22, wherein when the voltage of any battery cell of the battery array exceeds the maximum specified voltage, the voltage for charging the battery array is reduced, and a ratio for reducing the charging voltage is determined from an internal resistance of a battery cell that exceeded a maximum specified voltage, and when battery cell internal resistance is large, the ratio for reducing the charging voltage is made large.

26. The method of claim 22, wherein when the voltage of any battery cell of the battery array exceeds the maximum specified voltage, the voltage for charging the battery array is reduced to a battery voltage, which is a sum of the voltages of each battery cell.

27. The method of claim 15, wherein the voltage of each battery cell is detected at a prescribed sampling rate, when the voltage of any battery cell of the battery array exceeds a preset maximum specified voltage, a set current is reduced for performing constant current and constant voltage charging of the battery array.

28. The method of claim 27, wherein when the voltage of any battery cell of the battery array exceeds the maximum specified voltage, the set current for charging the battery array is reduced by a prescribed ratio.

29. The method of claim 27, wherein when the voltage of any battery cell of the battery array exceeds the maximum specified voltage, the set current for charging the battery array is reduced, and a ratio for reducing the set current is determined from a voltage difference between the maximum specified voltage and a voltage of the battery cell, and when the voltage difference is large, the ratio for reducing the set current is made large.

30. The method of claim 27, wherein when the voltage of any battery cell of the battery array exceeds the maximum specified voltage, the set current for charging the battery array is reduced, and a ratio for reducing the set current is determined from an internal resistance of a battery cell that exceeded the maximum specified voltage, and when battery cell internal resistance is large, the ratio for reducing the set current is made large.

31. The method of claim 15, wherein the maximum specified voltage is set in a range from 4.20V to 4.24V.

32. The method of claim 15, wherein the maximum specified voltage in the low temperature region is set from 30 mV to 300 mV lower than the maximum specified voltage in the standard temperature region.

33. The method of claim 15, wherein a maximum specified voltage for battery charging in a high temperature region is set lower than a maximum specified voltage for battery charging in a standard temperature region.

34. The method of claim 27, wherein the set current changes with battery temperature.

35. The method of claim 34, wherein reduction in set current is in accordance with multiple levels of a prescribed set current.

36. The method of claim 15, wherein the charging power for charging the battery cells is reduced according to output from a difference amplifier which compares a reference voltage with the voltage of the battery cell.

37. The method of claim 36,
wherein the difference amplifier comprises a positive-side difference amplifier to which a positive-side battery cell voltage is input, and a negative-side difference amplifier to which a negative-side battery cell voltage is input, and
wherein the charging power for charging the plurality of battery cells battery cells is reduced according to a signal issued by an OR circuit to which each output of the positive-side difference amplifier and the negative-side difference amplifier is input.

* * * * *